United States Patent Office 2,818,391
Patented Dec. 31, 1957

2,818,391

PREPARATION OF SELENIDE PHOSPHORS

Gilmore E. Crosby, Millersville, Pa., assignor to Radio Corporation of America, a corporation of Delaware No Drawing. Application October 31, 1956
Serial No. 619,395

11 Claims. (Cl. 252—301.6)

This is a continuation-in-part of patent application Serial No. 349,553, filed April 17, 1953, by Gilmore E. Crosby, and now abandoned.

This invention relates to improved methods of preparing zinc selenide, zinc-cadmium selenide, and cadmium selenide; and particularly to methods of preparing selenides which are substantially free of sulfides and which do not require hydrogen selenide as an intermediate.

Zinc selenide and zinc-cadmium selenide are important phosphor components and, activated with copper, are important phosphors for use in kinescopes employed in color television receivers and for electroluminescent devices. In order to prepare zinc selenide and zinc-cadmium selenide phosphors having high luminescence efficiency, good stability, and desirable emission spectra, it is necessary to start with selenides of high quality. Zinc selenide is also used to coat lenses of optical devices and as an intermediate in preparing hydrogen selenide. Cadmium selenide is an important raw material from which photoconducting and conducting powders can be made. For commercial production, it is also desirable to employ a method of preparing the selenides which is economical in cost.

One previously proposed method for preparing zinc selenide is to pass hydrogen selenide gas through a solution of the metal salt. Another method is to combine the vapor of free zinc and free selenium in a reaction tube at elevated temperatures. The latter reaction has the disadvantage of being explosive and losses can occur by vaporization of unreacted portions of the elements. Furthermore, hydrogen selenide gas is poisonous and difficult to handle. It is therefore desirable to avoid its use in commercial preparations. Another method is to fire a dry mixture of 2 moles of zinc oxide, 1 mole of zinc sulfide and 3 moles of selenium to obtain the reaction $2ZnO+ZnS+3Se \rightarrow 3ZnSe+SO_2$. It has been found that considerable amounts of Se and $SeO_2$ are volatilized from this process and that the reaction product is contaminated with sulfides. It has also been proposed to substitute cadmium for part or all of the zinc in the foregoing processes.

One object of the present invention is to provide improved methods of preparing high quality zinc selenide, zinc cadmium selenide, or cadmium selenide.

Another object of the present invention is to provide safe, non-explosive, dry methods of preparing zinc selenide, zinc cadmium selenide or cadnium selenide.

Still another object of the invention is to provide improved methods of preparing zinc selenide or zinc cadmium selenide capable of being made into efficient phosphors.

Another object of the invention is to provide improved methods of preparing cadmium selenide capable of being made into photoconducting and conducting powders.

A further object of the present invention is to provide improved methods of making zinc selenide, zinc cadmium selenide or cadmium selenide of high purity and which is substantially free of sulfides.

These and other objects will be more apparent and the invention will be more readily understood from the specific examples and the detailed description which follows.

In general, the present invention comprises an improved method of preparing zinc selenide, zinc cadmium selenide or cadmium selenide by firing a mixture of selenium, at least one oxide selected from the group consisting of zinc oxide and cadmium oxide and at least one sulfide selected from the group consisting of zinc sulfide and cadmium sulfide at a temperature above 600° C., the ratio of moles of selenium to moles of sulfide being about 3 to 0.9 and the ratio of moles of oxide to moles of sulfide being about 2.75 to 0.9.

*Example 1.*—A red-emitting zinc selenide phosphor can be prepared as follows. A mixture is prepared consisting of 3 gm. moles of powdered selenium, 2.75 gm. moles of zinc oxide, .9 gm. moles of zinc sulfide, 8.4 gms. of lithium bromide and .06 gm. of cupric chloride. This mixture is thoroughly mixed until it is homogeneous throughout and is then fired in a covered quartz crucible at a temperature of about 920° C. for 1 hour.

After cooling, it is preferable to wash out any unreacted ingredients. Unreacted zinc oxide can be washed out by treating the product with dilute hydrochloric acid, acetic acid, sulfuric acid or other acid in which zinc oxide is soluble. Excess acid must then be washed out with water. Unreacted selenium may be removed by treating the product with a 10% solution of potassium cyanide. Sodium sulfite solution may also be used to remove unreacted selenium.

The above material, which contains a small amount of copper activator, is luminescent and emits in the red region when excited with cathode rays. If a phosphor is not desired, the copper salt and flux are omitted.

In making a phosphor by the above-described method it is preferable to use very pure starting materials. The selenium should first be purified by distillation and the zinc oxide and zinc sulfide should be spectroscopically pure.

*The effect of more than theoretical zinc oxide.*—As indicated above, an excess of zinc oxide with relation to selenium is preferred. Although it is not absolutely necessary, it is preferred to have no unreacted selenium in the product. However, the product may be treated as indicated in Example 1 to remove unreacted zinc oxide or selenium.

There is a beneficial effect in using excess zinc oxide in the formulation. To show the effect of excess zinc oxide, samples were prepared according to the procedure of Example 1 but in place of the mol ratio of ZnO/ZnS/Se of 2.75/0.9/3.0, the mol proportion of zinc oxide was varied from 2.0 to 3.0, 2.0 being the theoretical quantity required. Table I shows the results of this investigation. The peak efficiencies given are the average of three series, the loss in firing are the average of two series. The color remained at 6400 A. for all samples. It is seen that the optimum efficiency is obtained with a mol ratio of 2.75/0.9/3.0. Also there is less loss by volatilization during firing as the proportion zinc oxide is increased.

In the dry process reaction, the batch will lose weight during firing. A large portion of this weight loss will be the by-product $SO_2$. The other portion of the weight loss will be $SeO_2$. Since zinc sulfide is used in less than theoretical quantities, $SeO_2$ will be present in excess and thus will evolve. $SeO_2$ has a sublimation temperature of 317° C. The $SeO_2$ along with the $SO_2$ constitute the theoretical weight loss during firing. Actually in a batch which will theoretically yield 353.4 grams of ZnSe, the theoretical loss by evolution will be 58.1 grams, 19.2% of which will be $SeO_2$. Table I shows that the volatile loss greater than theoretical is less with high zinc oxide concentrations. The loss by volatilization can also be reduced by increasing the batch size.

TABLE I

| Mol Ratio, ZnO/ZnS/Se | Relative Peak Efficiency | Grams Lost on Firing Greater Than Theor. Loss |
|---|---|---|
| 2.0/0.9/3.0 | 86 | 37 |
| 2.25/0.9/3.0 | 89 | 35 |
| 2.5/0.9/3.0 | 93 | 34 |
| 2.75/0.9/3.0 | 100 | 25 |
| 3.0/0.9/3.0 | 96 | 24 |

*The effect of less than theoretical zinc sulfide.*—Zinc sulfide is used in less than theoretical amounts so that sulfide is eliminated from the final product. Table II shows the effect of using less than theoretical and stoichiometric quantities. The samples represented in Table II contain a 3.0 to 3.0 ZnO to Se ratio and 3% CdSe in the final product. The CdSe was incorporated by substituting some CdS for ZnS. For the purpose of Table II, CdS was changed mole for mole to ZnS. As can be seen in Table II, the luminescent color peaks between 6650 A. and 6660 A. for 0.9 mol ZnS. This is the same color obtained from a phosphor prepared from precipitated zinc cadmium selenide. The table shows that the color is shifted toward the yellow when theoretical quantities of ZnS are used. Samples having the correct color were analyzed and found to have 0.5% sulfur. This shows that even with a deficiency of zinc sulfide as a reactant some sulfur remains in the product but is not sufficient to shift the luminescent color.

TABLE II

*Ratio of reactants*

| Sample No. | Ratio, ZnO/ZnS/Se | Luminescent Peak, Angstroms |
|---|---|---|
| 2889 | 3/0.9/3 | 6,660 |
| 2897 | 3/0.9/3 | 6,660 |
| 2907 | 3/0.9/3 | 6,650 |
| 2909 | 3/0.9/3 | 6,650 |
| 2912 | 3/1.0/3 | 6,600 |
| 2913 | 3/1.0/3 | 6,640 |
| 2940 | 3/1.0/3 | 6,620 |

*Effect of firing atmosphere on the final phosphor.*—To study the effect of firing atmospheres on the phosphor efficiency, samples were prepared as outlined in Example I but the firing conditions were changed. Firing was performed by placing the sample in a quartz boat, inserting the filled boat in a quartz tube and placing the quartz tube with sample in a furnace at 900° C. for one hour. The atmosphere in the quartz tube was controlled thus permitting different atmospheres for each sample. Samples were fired in atmospheres as listed in Table III. There was no shift in luminescent color. Table III shows the varying peak efficiencies resulting from various atmospheres. It will be noticed that highly oxidizing or reducing atmospheres give valueless products. Neutral or slightly oxidizing atmospheres are beneficial. It must be remembered that a by-product of the dry process reaction is $SO_2$. Therefore firing in $N_2$ is not a totally neutral atmosphere. The best atmosphere is $CO_2$, with atmospheres of $SO_2$ and $N_2$ being acceptable.

TABLE III

*Efficiency of phosphors prepared under varying atmospheres*

| Atmosphere | Relative Peak Efficiency |
|---|---|
| $SO_2$ | 101 |
| $CO_2$ | 110 |
| $CO$ | 37 |
| $N_2$ | 98 |
| $NH_3$ | inert |
| $H_2$ | 28 |
| Air | inert |
| $O_2$ | inert |

*Discussion of the firing procedure.*—One firing technique comprises loading the material to be fired in a quartz crucible, placing an inverted quartz lid on top of the material, filling the inverted lid with unfired zinc sulfide, covering the entire crucible with a quartz lid, and firing. The quartz lid filled with zinc sulfide gives a simple method of maintaining an $SO_2$ atmosphere. The zinc sulfide reacts with any air present to give $SO_2$ and ZnO. From the study on atmospheres it is seen that an $SO_2$ atmosphere is desirable. The dry process yields $SO_2$ as a by-product and, it would seem, should be capable of providing its own atmosphere. This is the case but the inverted lid containing zinc sulfide on top of the charge gave slightly improved products.

From the previous section it is obvious that a $CO_2$ atmosphere is most preferable. This type atmosphere should be used if a simple factory technique of giving a $CO_2$ atmosphere can be provided.

*Discussion of the washing procedure.*—Washing the fired product is desirable. Adequate washing procedure removes unreacted zinc oxide and traces of elemental selenium. The need for excess zinc oxide has been shown. This excess is removed after firing so that better efficiencies can be obtained. The excess zinc oxide may be removed by adding hydrochloric acid to a water slurry of the fired material until the pH is lowered and remains at 2.0. By acidifying to pH 2.0, the excess zinc oxide is reacted, but the acidity is not great enough to cause decomposition of the zinc selenide at room temperature.

The dry process zinc selenide contains some elemental selenium. This may be removed by washing in a 10% sodium sulfite solution. A hot solution of sodium sulfite will give a rapid and efficient dissolution of selenium, but a cold solution is successful only if sufficient time is given for traces of selenium to dissolve. While sodium sulfite is recommended for factory processing, a solution of sodium or potassium cyanide is also effective in removing selenium.

*The effect of firing time and temperature.*—The firing temperature may be varied considerably. It is preferably kept within a range of about 600° C. to about 1000° C. but this is not critical. If the temperature is too high, however, some of the selenium boils away and is lost.

The time of firing also is not critical. In general, it may be varied from about 15 minutes to several hours. The temperature of firing and the size of the batch are factors which largely control the optimum length of firing time.

Results of firing batches for varying times at various temperatures are given in Table IV. It will be noted that the average particle sizes are given for batches with good efficiencies, the particle size being important in application work. Actually a compromise between optimum firing temperature and time and the resulting particle size has to be made. The smallest possible particle size is desired yet a reasonable firing time is important. The firing temperatures and times such as 700° C. for ½ hour and then 900° C. for 1 hour, gave an efficient product (100% Peak Eff. Part. size approx. 3.1). Firing at 700° C. for the first ½ hour reduces loss by volatilization and gives a more desirable yield.

TABLE IV

*Firing time and temperature versus efficiency and particle size*

| Firing Time, Firing. Temp. | ½ hour | | 1 hour | | 2 hours | | 3 hours | |
|---|---|---|---|---|---|---|---|---|
| | Peak Eff. | Particle Size | Peak Eff. | Particle Size | Peak Eff. | Particle Size, Microns | Peak Eff. | Particle Size, Microns |
| 750 | 22 | | 76 | | 100 | 2.8 | 94 | 3.0 |
| 800 | 15 | | 96 | 3.1 | 97 | 2.9 | 97 | 2.9 |
| 900 | 100 | 3.1 | 98 | 3.1 | 99 | 3.5 | | |
| 1,000 | 105 | 3.6 | 104 | 3.5 | | | | |
| 1,100 | 90 | | | | | | | |
| 1,200 | 83 | | | | | | | |

*Flux and flux concentration.*—Although it is desirable to use a flux when a phosphor is being prepared, the flux may be omitted entirely. It is also omitted if non-luminescent zinc selenide is being prepared or if cadmium compounds are substituted and cadmium selenide is being prepared. Suitable fluxes are any of the alkali halides including the ammonium halides, also the alkaline earth metal halides. Luminescence efficiency of the phosphor has been found to vary with the particular halide used. The preferred amount of flux is about 2% by weight of the selenide product but this is not at all critical. Amounts up to 10% can be used, for example. Samples of the zinc selenide phosphor were made according to Example 1, except the flux and flux concentration were varied. Thirteen different fluxes were used at concentrations of 1, 3, 6 and 10% of the total weight of starting materials. Each flux was added as solution having been previously purified by slurrying with precipitated ZnS and filtering. The evaluation of the peak and visual efficiencies together with the luminescent peak wavelength indicated the most desirable flux and flux concentration. Peak efficiencies resulting from the use of different fluxes at varying concentrations are given in Table V. The average efficiencies and color are given in Table VI. Lithium bromide was selected as giving optimum results although calcium bromide, strontium chloride and strontium bromide were also acceptable. The optimum flux concentration was between 1 and 3% of the total weight of starting materials.

TABLE V

*Peak efficiencies of ZnSe phosphors using different fluxes at varying concentrations*

| Flux | Percent Efficiency (Peak) | | | | Average Peak Efficiency |
|---|---|---|---|---|---|
| | 1% Flux Conc. | 3% Flux Conc. | 6% Flux Conc. | 10% Flux Conc. | |
| LiCl | 104 | 100 | 101 | 99 | 101 |
| LiBr | 109 | 110 | 102 | 113 | 109 |
| NaCl | 59 | 67 | 70 | 77 | 68 |
| NaBr | 105 | 100 | 90 | 91 | 97 |
| NaCl | 67 | 69 | 20 | 46 | 51 |
| KCl | 86 | 75 | 69 | 67 | 74 |
| KBr | 96 | 89 | 95 | 91 | 93 |
| KCl | 41 | 50 | 49 | 56 | 49 |
| CaCl₂ | 97 | 102 | 101 | 101 | 100 |
| CaBr₂ | 108 | 104 | 110 | 98 | 105 |
| SrCl₂ | 106 | 107 | 103 | 98 | 104 |
| SrBr₂ | 109 | 114 | 99 | 93 | 104 |
| BaCl₂ | 98 | 92 | 89 | 84 | 91 |
| No Flux | | | | | 84 |

TABLE VI

*Average efficiencies and color resulting from varying fluxes*

| Flux | Average Peak Eff. | Average Visual Eff. | Average Peak Lum. Color |
|---|---|---|---|
| LiCl | 101 | 104 | 6465 |
| LiBr | 109 | 120 | 6450 |
| NaCl | 68 | 85 | 6410 |
| NaBr | 97 | 100 | 6440 |
| NaCl | 51 | 73 | 6445 |
| KCl | 74 | 83 | 6405 |
| KBr | 93 | 97 | 6430 |
| KCl | 49 | 70 | 6360 |
| CaCl₂ | 100 | 109 | 6425 |
| CaBr₂ | 105 | 116 | 6415 |
| SrCl₂ | 104 | 105 | 6430 |
| SrBr₂ | 104 | 106 | 6410 |
| BaCl₂ | 91 | 94 | 6430 |
| No Flux | 84 | 99 | 6430 |

*Optimum activator concentration.*—The amount of copper activator in the product may be varied between about .001 and 0.2% by weight based on the weight of the selenide product. The preferred range is about .005 to .008% and the amount of copper chloride given in the example is intended to furnish about .0075% copper in the product. To determine the optimum activator concentration, samples were made according to the procedure of Example 1, except the activator concentration was varied from .001% to .020% by weight of the theoretical yield. The luminescent results are given in Table VII. It will be noted that maximum efficiencies are obtained with an activator concentration between .005% and .010% and that the luminescent color shifts toward the yellow with increasing activator concentration. An activator concentration of .0075% was selected for the standard procedure.

TABLE VII

*Efficiencies and color versus activator conc*

| Percent Cu Activator | Relative Peak Eff. | Relative Visual Eff. | Peak Lum. Color A |
|---|---|---|---|
| .001 | 78 | 123 | 6450 |
| .003 | 84 | 123 | 6475 |
| .005 | 93 | 138 | 6425 |
| .0075 | 99 | 145 | 6440 |
| .010 | 99 | 151 | 6435 |
| .0125 | 85 | 128 | 6425 |
| .015 | 75 | 136 | 6380 |
| .020 | 56 | 117 | 6390 |

If it is desired to prepare zinc cadmium selenide instead of zinc selenide, part of the zinc in the raw batch can be replaced mol for mol with cadmium. If it is desired to prepare cadmium selenide, cadmium is substituted for all of the zinc in the raw batch.

The mechanism of the reaction is considered to be as follows: The selenium and zinc oxide or cadmium oxide react to give zinc selenide or cadmium selenide and selenium dioxide. The selenium dioxide reacts immediately with the zinc sulfide or cadmium sulfide to give additional zinc selenide or cadmium selenide and sulfur dioxide gas. The gas is driven off during the firing operation.

The process of the invention has been found to be suitable for the production of zinc selenide, zinc cadmium selenide or cadmium selenide in commercial quantities and has been found particularly advantageous for the production of pure phosphor materials. In preparing phosphors, activators other than copper may, of course, be used in any conventional amount.

*Example 2.*—Pure zinc selenide may be prepared as follows. A mixture is prepared consisting of 3 gm. moles of powdered selenium, 2.75 gm. moles of zinc oxide, and 9 gm. moles of ZnS. This mixture is thoroughly mixed until homogeneous throughout and is then fired in a covered crucible at a temperature of about 800° C. for 1 hour. The product may be washed as in Example 1.

*Example 3.*—Pure zinc-cadmium selenide may be prepared according to the procedure of Example 2 except the raw batch is:

2.75 gm. moles ZnO
0.6 gm. moles ZnS
0.3 gm. moles CdS
3.0 gm. moles Se

The product has the approximate composition 0.9 ZnSe:0.1 CdSe.

*Example 4.*—Pure zinc cadmium selenide may be prepared according to the procedure of Example 2 except that the raw batch is:

1.90 gm. moles ZnO
.85 gm. moles CdO
0.9 gm. moles CdS
3.0 gm. moles Se

The product has the approximate composition 0.4 ZnSe:0.6 CdSe.

*Example 5.*—Pure cadmium selenide may be prepared as follows. A mixture is prepared consisting of 3.0 gm. moles of powdered selenium, 2.75 gm. moles of cadmium oxide, and 0.9 gm. moles cadmium sulfide. This mixture is thoroughly mixed until homogeneous throughout and is then fired in a covered crucible at a temperature of about 700° C. for 1 hour. To remove excess CdO, the temperature can be raised to above 950° C. The product may be washed as in Example 1.

*Example 6.*—Cadmium selenide may be prepared as follows. A mixture is prepared consisting of 3.0 gram moles of powdered selenium, 2.75 gram moles of cadmium oxide (or cadmium carbonate), and 0.9 gram moles cadmium sulfide. For some uses, it may be desirable to include an excess of selenium over 3.0 gram moles. This mixture is thoroughly mixed until homogeneous throughout and is then fired in a covered crucible at a temperature of about 700° C. for 1 hour. The product may be washed as in Example 1.

*Example 7.*—Photoconducting cadmium selenide may be prepared as follows. A mixture is prepared consisting of 3.0 gram moles of powdered selenium, 2.75 gram moles of cadmium carbonate and 0.9 gram moles cadmium sulfide, 42 grams cadmium chloride, and .085 gram cupric chloride. This mixture is thoroughly mixed until homogeneous throughout and is then fired in a covered crucible at a temperature of about 700° C. for 1 hour. The product may be washed as in Example 1.

*Example 8.*—Electroluminescent zinc selenide may be prepared as follows. A mixture is prepared consisting of 3.0 gram moles of powdered selenium, 2.75 gram moles of zinc oxide, 0.9 gram moles of zinc sulfide, 12 grams lithium bromide, and 0.85 gram cupric bromide. This mixture is thoroughly mixed until homogeneous throughout and is fired in a covered crucible at a temperature of about 700° C. for ½ hour and then at a temperature of about 1050° C. for 1½ hours. The product may be washed as in Example 1.

What is claimed is:

1. A method of preparing a material selected from the group consisting of zinc selenide, zinc-cadmium selenide and cadmium selenide comprising firing a mixture of selenium, at least one oxide selected from the group consisting of zinc oxide and cadmium oxide and at least one sulfide selected from the group consisting of zinc sulfide and cadmium sulfide at a temperature of 600° C. to 1050° C., the ratio of moles of selenium to moles of sulfide being about 3 to 0.9 and the ratio of moles of oxide to moles of sulfide being about 2.75 to 0.9.

2. The method of claim 1 in which said reaction is carried out at a temperature of about 700° C. to 1000° C.

3. A method of preparing zinc selenide comprising firing a mixture of selenium, zinc oxide and zinc sulfide at a temperature between about 700° C. and 1000° C., the ratio of moles of selenium to moles of zinc sulfide being about 3 to 0.9 and the ratio of moles of zinc oxide to moles of zinc sulfide being about 2.75 to 0.9.

4. The method of claim 3 in which cadmium is substituted for up to 100% of the zinc.

5. A method of preparing zinc selenide comprising firing a mixture of selenium, zinc oxide and zinc sulfide at a temperature of about 920° C., the ratio of moles of selenium to moles of zinc sulfide being about 3 to 0.9 and the ratio of moles of zinc oxide to moles of zinc sulfide being about 2.75 to 0.9.

6. A method of preparing cadmium selenide comprising firing a mixture of selenium, cadmium oxide and cadmium sulfide at a temperature between about 600° C. and 1000° C., the ratio of moles of selenium to moles of cadmium sulfide being about 3 to 0.9 and the ratio of moles of cadmium oxide to moles of cadmium sulfide being about 2.75 to 0.9.

7. A method of preparing a phosphor selected from the group consisting of copper-activated zinc selenide and copper-activated zinc-cadmium selenide comprising reacting a mixture of selenium, at least one oxide selected from the group consisting of zinc oxide and cadmium oxide, a copper activator and at least one sulfide selected from the group consisting of zinc sulfide and cadmium sulfide at a temperature of 600° C. to 1050° C., the ratio of moles of selenium to moles of sulfide being about 3 to 0.9, the ratio of moles of oxide to moles of sulfide being about 2.75 to 0.9.

8. A method of preparing a copper-activated zinc selenide phosphor comprising firing a mixture of selenium, zinc oxide, zinc sulfide and a copper activator at a temperature between 700° C. and 1000° C., the ratio of moles of selenium to moles of zinc sulfide being about 3.0 to 0.9 and the ratio of moles of zinc oxide to moles of zinc sulfide being about 2.75 to 0.9.

9. A method of preparing a photoconducting material comprising firing a mixture of selenium, cadmium oxide, cadmium sulfide and a copper activator at a temperature between 600° C. and 1000° C., the ratio of moles of selenium to moles of cadmium sulfide being about 3.0 to 0.9 and the ratio of moles of cadmium oxide to moles of cadmium sulfide being about 2.75 to 0.9.

10. The method of claim 9 wherein said temperature is about 700° C.

11. A method for preparing an electroluminescent phosphor comprising firing a mixture of selenium, zinc oxide, zinc sulfide, a copper activator and a flux at a temperature of about 700° C., the ratio of moles of zinc oxide to zinc sulfide to selenium being about 2.5 to 0.9 to 3.0; and then further firing the mixture at about 1050° C.

References Cited in the file of this patent

UNITED STATES PATENTS 2,546,239    Rothschild _____ Mar. 27, 1951

FOREIGN PATENTS 699,302    Germany _____ Nov. 26, 1940

UNITED STATES PATENT OFFICE
CERTIFICATE OF CORRECTION

Patent No. 2,818,391                                            December 31, 1957

Gilmore E. Crosby

It is hereby certified that error appears in the printed specification of the above numbered patent requiring correction and that the said Letters Patent should read as corrected below.

Column 6, line 74, for "9 gm. moles" read -- .9 gm. moles --; column 8, line 58, for "about 2.5" read -- about 2.75 --.

Signed and sealed this 18th day of February 1958.

(SEAL)
Attest:

KARL H. AXLINE                                                  ROBERT C. WATSON
Attesting Officer                                           Commissioner of Patents